United States Patent
Amirzadeh et al.

(10) Patent No.: US 6,927,747 B2
(45) Date of Patent: Aug. 9, 2005

(54) DUAL DIRECTIONAL DISPLAY FOR COMMUNICATION DEVICE

(75) Inventors: Habib Amirzadeh, Weston, FL (US); Julio C. Castaneda, Coral Springs, FL (US); David S. Fredley, Coral Springs, FL (US); Rudy Yorio, Pompano Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 35 days.

(21) Appl. No.: 10/630,408

(22) Filed: Jul. 30, 2003

(65) Prior Publication Data

US 2005/0024319 A1 Feb. 3, 2005

(51) Int. Cl.⁷ .................................................. G09G 5/14
(52) U.S. Cl. ........................................ 345/4; 345/102
(58) Field of Search ................................. 345/102, 4–6; 349/112; 455/403, 566, 550

(56) References Cited

U.S. PATENT DOCUMENTS

| 5,570,216 | A | * | 10/1996 | Lu et al. .................... 349/175 |
| 5,896,575 | A | * | 4/1999 | Higginbotham et al. .... 455/566 |
| 2003/0112217 | A1 | * | 6/2003 | Lee ............................. 345/102 |

* cited by examiner

*Primary Examiner*—Sumati Lefkowitz
*Assistant Examiner*—Ke Xiao (57) ABSTRACT

A communication device (100) comprising a body portion (110) and a display portion (130) that is rotatably connected to the body portion. A switch (160,161, 162, 163,164) is operable to reverse the modes of the inner (141) and outer (142) bistable clear-reflective layers in response to rotation of the display portion (130) with respect to the body portion (110).

17 Claims, 7 Drawing Sheets

DUAL DIRECTIONAL DISPLAY FOR COMMUNICATION DEVICE

FIELD OF THE INVENTION

This invention relates generally to displays in communication devices. More specifically this invention relates to displays in communication devices, which permit a viewing of the same image on either one or the other side of the display based on the angular position of the display.

BACKGROUND OF THE INVENTION

Liquid crystal displays (LCD) are being used in many communication devices, such as, for example, televisions, computer monitors, PDA's, global positioning systems, laptop computers, cell phones, digital cameras, video screens in vehicles such as cars and airplanes and other such communication devices. LCDs are formed by stacking layers or portions of layers of materials including glass, plastic, metals and organics films. LCDs provide both a reflective layer and a clear layer, which, in combination with other layers, permit an image to be seen on one side of the display stack. In hinged devices, such as flip cell phones with flip-to-open mechanisms, two LCDs are needed if an observer is to see an image, such as a caller ID number, text messages or photographs without opening the phone and then to see the image upon opening the flip cell phone.

It is desirable to be able to view the image from either one side or the other side of a display so that one display is able to provide images in a flip cell phone and like devices.

SUMMARY OF THE INVENTION

One aspect of the present invention provides a communication device with a body portion and a display portion, which is rotatably connected to the body portion. A switch is operable to reverse the modes of the inner and outer bistable clear-reflective layers in response to the rotation of the display portion with respect to the body portion.

Another aspect of the present invention is a method for displaying information on a display of a communication device. The method comprises sending a reverse mode signal to an inner and an outer bistable clear-reflective layer of the display in response to rotation of the display with respect to the body portion of the communication device. The mode of the outer bistable clear-reflective layer and the mode of the inner bistable clear-reflective layer are reversed in response to the reverse mode signal.

A third aspect of the present invention provides a computer usable medium storing a computer program comprising a computer readable code for distinguishing images in an array of pixels which are controlled by circuitry and computer readable code for providing a rotate-mode signal to a processor, which is electrically connected to the circuitry in response to actuation of a switch.

The forgoing device and other devices as well as features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

The present invention is illustrated by way of example and not limitation in the accompanying figures, in which like references indicate similar elements, and in which.

DETAILED DESCRIPTION OF THE DRAWINGS

Figure 1:
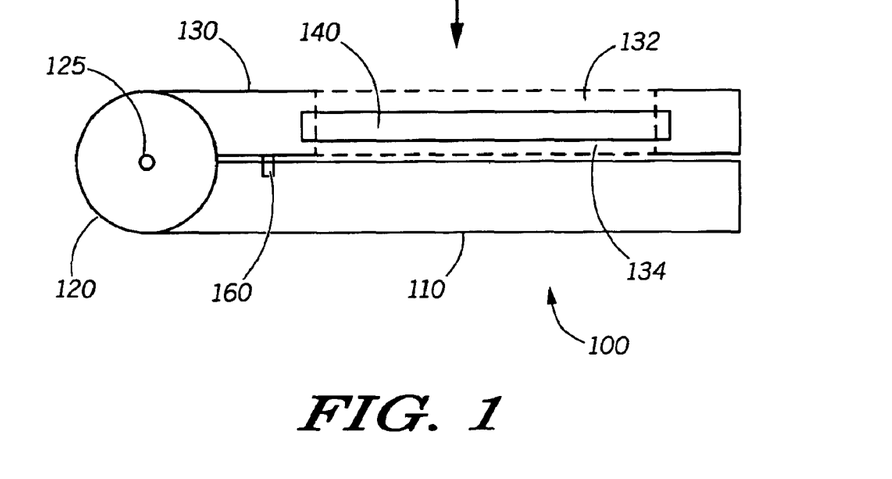
FIG. 1 illustrates a side view of a first embodiment of a communication device in a closed position.

FIG. 1 illustrates a side view of a first embodiment of a communication device 100 in a closed position. The body portion 110 is attached with a hinge 120 to a display portion 130. A display 140 is positioned within the display portion 130 of the communication device 100. An open area 132 in the display portion 130 allows for viewing of the display 140 from the side containing the arrow above the display 140, when the communication device is closed. In another embodiment of this present invention, a lens or transparent material, such as, for example, glass, plastic or quartz, may be positioned within the open area 132 to allow improved viewing and/or to protect the display 140. Another open area 134 in the display portion 130 is between the display 140 and the body portion 110 when the communication device is closed. A switch 160 is partially within the body portion 110 and is partially within the area between the body portion 110 and the display portion 130. The connecting hinge 120 has a central region 125 when viewed from the side. The axis of rotation (not shown) is normal to the hinge 120 and passes through the central region 125.

Figure 2:
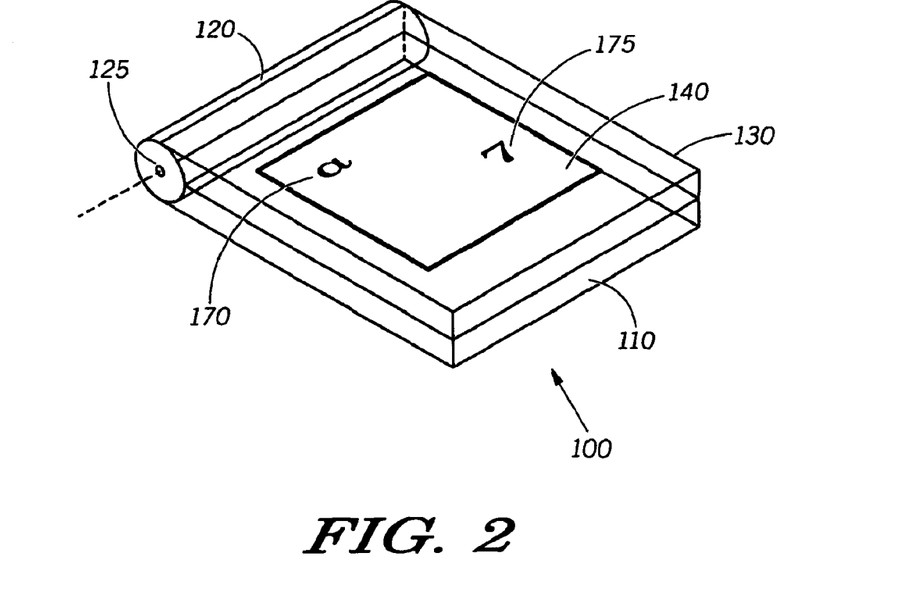
FIG. 2 illustrates an oblique view of the first embodiment of the communication device in a closed position.

FIG. 2 illustrates an oblique view of the first embodiment of the communication device 100 in a closed position. The body portion 110 and the display portion 130 are seen connected by the hinge 120 with an axis of rotation, shown as the dashed line, normal to the central region 125 of the hinge 120. From this oblique vantage point of the display 140 two images 170, 175 are visible. An image of an "a" 170 is seen in the upper left corner of the display 140 and an image of "7" 175 is visible on the right side, midway between the top and the bottom of the display 140. These images are visible through the open area 132 (FIG. 1). Images can be letters, numbers, photographic images or video images.

Figure 3:
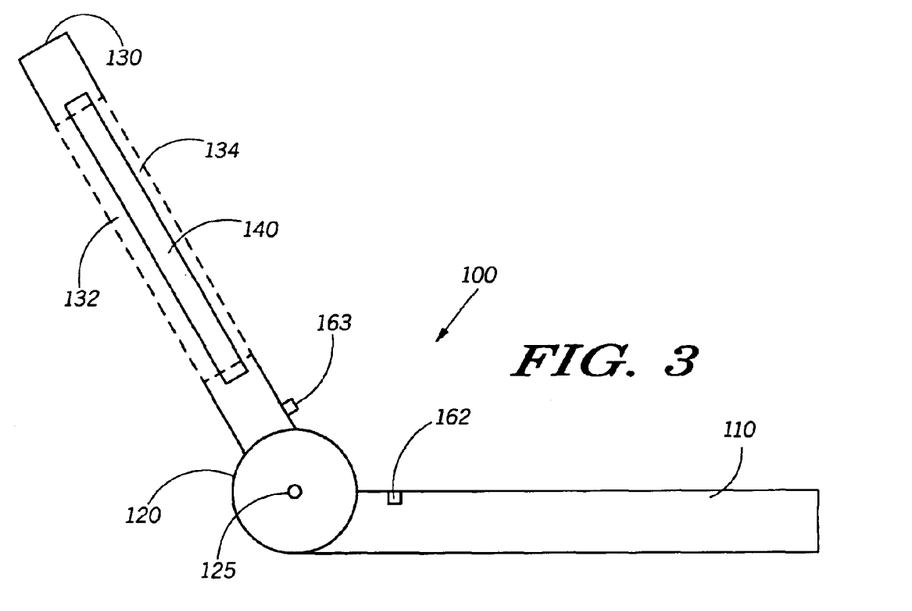
FIG. 3 illustrates a side view of the first embodiment of the communication device in an open position.

FIG. 3 illustrates a side view of the first embodiment of the communication device 100 in an open position after the body portion 110 and the display portion 130 have been rotated about the central region 125 of the hinge 120. The axis of rotation (FIG. 2) is normal to the hinge 120 and passes through the central region 125. A display 140 is positioned within the display portion 130 of the communication device 100. The open area 134 in the display portion 130 allows for viewing of the display 140 from the side containing the arrow pointing at the display 140, when the communication device is in the open position. In another embodiment of this present invention, a lens or optically transparent material, such as, for example, glass, plastic or quartz, may be positioned in the open area 134 to allow improved viewing and/or to protect the display 140. The images 170, 175 visible in FIG. 2 are not visible through the open area 132, but rather are seen from the side containing the straight arrow pointing to the display 140. The open areas 132 and 134 may be the same size and shape or they may be different sizes and shapes. The switch 160 (FIG. 1) is now seen in two parts. The display-side switch 163 is on the display portion 130 and the body-side switch 162 is on the body portion 110. The display side switch 163 and body side switch 162 are positioned so that they are above each other when the communication device 100 is in the open position or in contact with each other when the communication device 100 is in the closed position.

Figure 4:
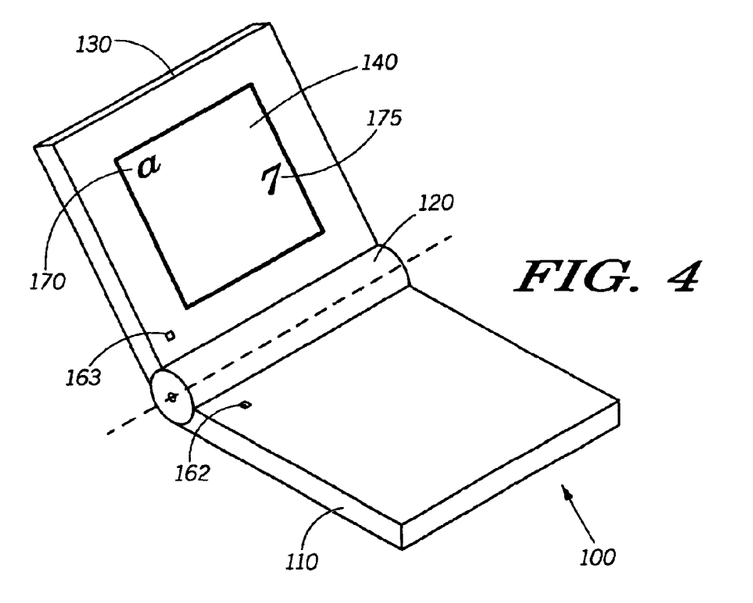
FIG. 4 illustrates an oblique view of the first embodiment of the communication device in an open position.

FIG. 4 illustrates an oblique view of the first embodiment of the communication device 100 in an open position. The body portion 110 and the display portion 130 are shown positioned with an approximately 120° angle between them. They are held in position by the hinge 120 which has an axis of rotation, indicated by the dashed line. From this oblique vantage point of the display 140, two images 170, 175 are visible. An image of an "a" 170 is seen in the upper left corner of the display 140 and an image of "7" 175 is visible on the right side, midway between the top and the bottom of the display 140, just as they were seen on the other side of the display 140 when the communication device 100 was in the closed position. These images are visible through the open area 134 (FIGS. 1 and 3). The switch 160 (FIG. 1) is now seen in two parts. The display-side switch 163 is on the display portion 130 and the body-side switch 162 is on the body portion 110. The display side switch 163 and body side switch 162 are positioned so that they are above each other or in contact with each other when the communication device 100 is in the closed position.

Figure 5:
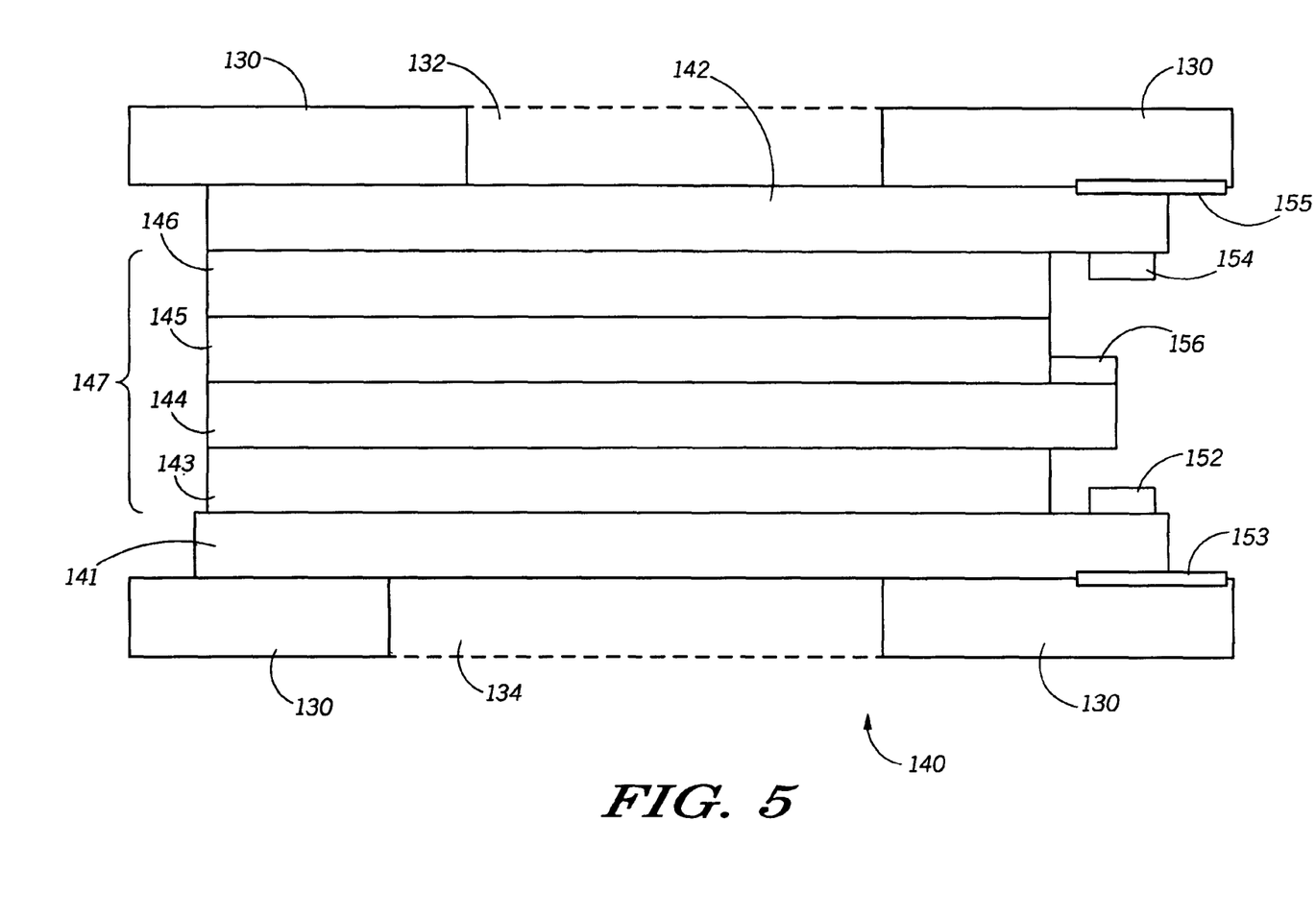
FIG. 5 illustrates schematically a side view of the layers of a first embodiment of the display in the communication device.

FIG. 5 illustrates schematically a side view of the layers of a first embodiment of the display 140 in the communication device 100. An inner bistable clear-reflective layer 141 is positioned above the open area 134 and portions of the display portion 130. An outer bistable clear-reflective layer 142 is below the open area 132 and portions of the display portion 130. The bistable clear-reflective material, which forms inner bistable clear-reflective layer 141 and outer bistable clear-reflective layer 142, has two modes. One mode is the clear mode when the bistable clear-reflective material is at least partially transparent to some or all wavelengths in the visible region. The other mode is the reflective mode when the bistable clear-reflective material reflects some or all wavelengths in the visible region, which are incident upon it. Bistable clear-reflective material will switch from an optically clear mode to reflective mode upon the application of voltage pulse. Additionally, bistable clear-reflective material will switch from reflective mode to an optically clear mode upon the application of voltage.

Bistable clear-reflective materials include, but are not limited to, cholesteric liquid crystals and ferro-electric liquid crystals. Cholesteric liquid crystals are chiral, twisted molecules with a high degree of order along one axis. Along that axis they are periodic. The reflective mode of a cholesteric liquid crystal occurs when the liquid crystal is in the planar state. The clear mode of a cholesteric liquid crystal occurs when the liquid crystal is in the focal conic mode. The cholesteric liquid crystals will switch from one mode to the other upon application of a pulse of voltage. As an example, a 50 V pulse for 10 to 20 msec is sufficient for mode switching of cholestric liquid crystals.

Ferro-electric liquid crystals are bistable clear-absorptive materials. They are at least partially transparent to some or all wavelengths in the visible region in one mode and absorptive of some or all wavelengths in the visible region in the other mode. A display 140 with bistable clear-absorptive material may require backlighting for best visibility of images.

In display 140, when the inner bistable clear-reflective layer 141 is in the clear mode, the outer bistable clear-reflective layer 142 will be in the reflective mode. When the inner bistable clear-reflective layer 141 is in the reflective mode, the outer bistable clear-reflective layer 142 will be in the clear mode. In between the inner bistable clear-reflective layer 141 and the outer bistable clear-reflective layer 142, is an LCD stack 147 comprised of an inner polarizer layer 143, an inner glass layer 144, an outer glass layer 145, and an outer polarizer layer 146. The pixels (not shown) for producing images are in a layer between the inner glass layer 144 and the outer glass layer 145. LCDs are designed and controlled to produce images in displays as is known to those of ordinary skill in the art. The sections of the display portion 130 illustrated in FIG. 5 hold the stack of layers 141 through 146 in place in the display portion 130. In another embodiment (not shown) a lens or optically transparent material, such as, for example, glass or quartz, may be positioned in the open areas 132 and 134 to allow improved viewing and/or to protect the display 140.

The electrodes 152 and 153 are operable to apply the mode switching voltage to the inner bistable clear-reflective layer 141. The electrodes 152 and 153 can be made of Indium-Tin-Oxide or another transparent metal and contact one side of the inner bistable clear-reflective layer 141. The electrodes 154 and 155 are operable to apply the mode switching voltage to the outer bistable clear-reflective layer 142. In one arrangement, the application of voltage to the inner bistable clear-reflective layer 141 and the outer bistable clear-reflective layer 142 occurs simultaneously so that inner bistable clear-reflective layer 141 and the outer bistable clear-reflective layer 142 will switch modes simultaneously, providing one layer of reflective and one layer of clear material at all times. Thus, one of either the inner bistable clear-reflective layer 141 or the outer bistable clear-reflective layer 142 will act as the reflective layer of the display. In FIGS. 1 and 2, the inner bistable clear-reflective layer 141 is reflective and the outer bistable clear-reflective layer 142 is optically clear. In FIGS. 3 and 4, the inner bistable clear-reflective layer 141 is optically clear and the outer bistable clear-reflective layer 142 is reflective. The invention, however, is not limited in this regard, as the switching can occur non-simultaneously.

The electrode 156 is part of an array of electrodes operable to control the pixels in the LCD stack 147, as is known to those of ordinary skill in the art. The electrodes 152–156 can be formed from gold, tin, aluminum, silver, nickel, titanium and alloys and combinations thereof.

Figure 6:
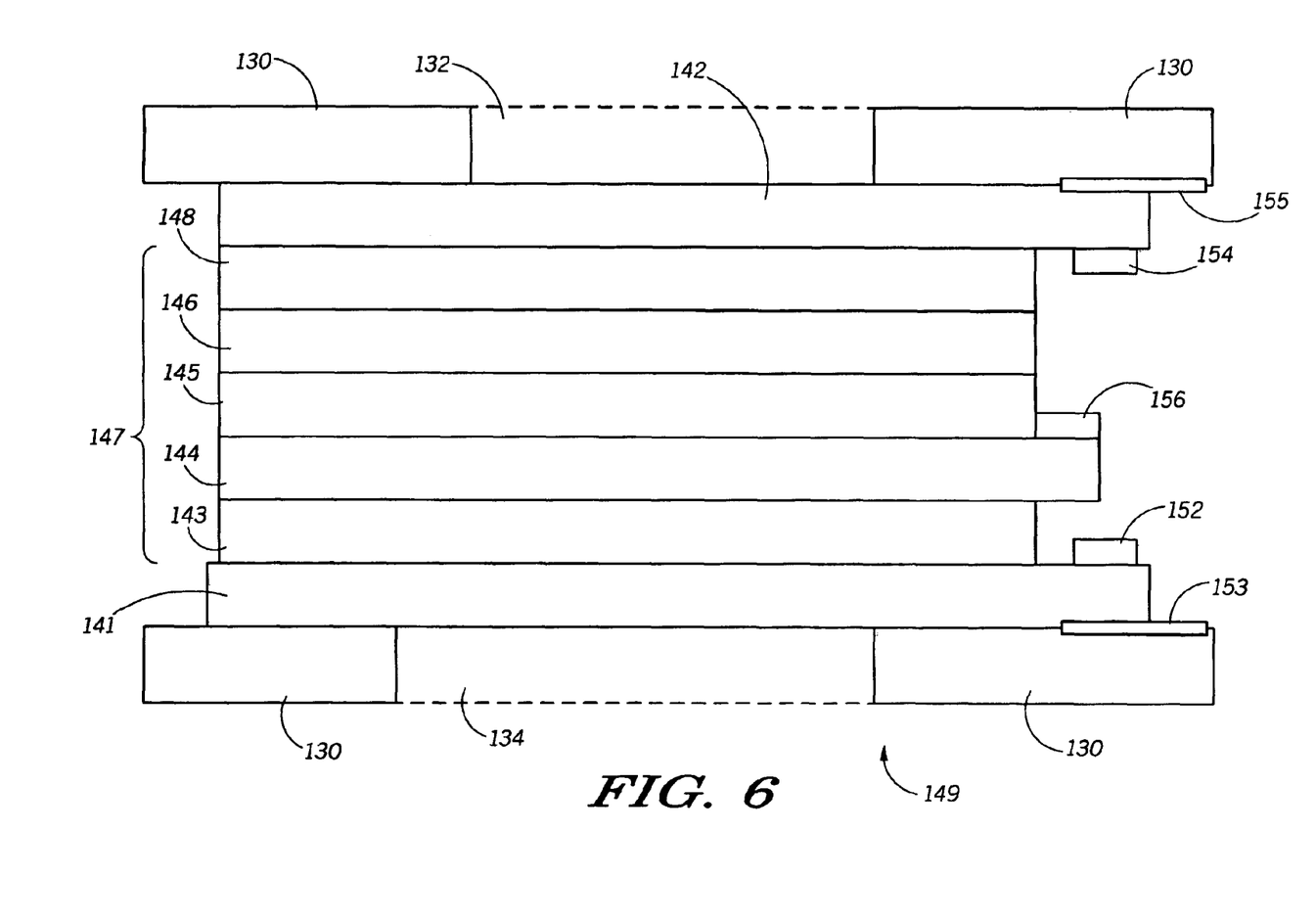
FIG. 6 illustrates schematically a side view of the layers of a second embodiment of the display in the communication device.

FIG. 6 illustrates schematically a side view of the layers of display 149 in the display portion 130 of communication device 100. Display 149 differs from display 140 (FIG. 5) by the addition of a light guide 148 between the outer bistable clear-reflective layer 142 and the outer polarizer 146. As in FIG. 5, an inner bistable clear-reflective layer 141 is positioned above the open area 134 and a section of the display portion 130. An outer bistable clear-reflective layer 142 is below the open area 132. In display 149, when the inner bistable clear-reflective layer 141 is in the clear mode, the outer bistable clear-reflective layer 142 will be in the reflective mode. When the inner bistable clear-reflective layer 141 is in the reflective mode, the outer bistable clear-reflective layer 142 will be in the clear mode. In between the inner bistable clear-reflective layer 141 and the outer bistable clear-reflective layer 142, is an LCD stack 147 comprised of an inner polarizer layer 143, an inner glass layer 144, an outer glass layer 145, and an outer polarizer 146. Lightguide 148 is above the outer polarizer 146 and below the outer bistable clear-reflective layer 142. The lightguide 148 carries light coupled into the edges of the lightguide 148 from light emitting diodes (LEDs) (not shown) as is known to those of ordinary skill in the art. This light is scattered off of the reflective surfaces (the inner bistable clear-reflective layer 141 or outer bistable clear-reflective layer 142) and illuminates the image. This is needed when the ambient light is insufficient for viewing by an observer of the image. The light propagating through the lightguide 148 can be scattered out of the lightguide by a Bragg reflective grating (not shown) between the lightguide 148 and the outer bistable clear-reflective layer 142. In FIG. 6 the outer bistable clear-reflective layer 142 is attached to the lightguide 148 and the periodic structure of the outer bistable clear-reflective layer 142 may function as the Bragg grating to couple light out of the lightguide 148, if the periodic spacing of the liquid crystal is of the correct spacing for the light in the lightguide 148. The lightguide 148 functions as a backlight when the communication device 100 is in the open position and as a frontlight when the communication device 100 is in the closed position.

Other embodiments of the present invention, which one can envision, may include a second lightguide between the inner bistable clear-reflective layer 141 and the inner polarizer 143 within the display 149. In such an embodiment the LEDs could operate to couple into one or the other of the bistable clear-reflective layers 141, 142 dependent upon the position of the display portion 130 with respect to the body portion 110. A mechanical switch adjacent to the LEDs can operate to change the LED coupling position upon rotation of the display portion 130 with respect to the body portion 110 of the communication device 100. In such an embodiment the additional lightguide will act as a backlight when the communication device is in the closed position and the lightguide 148 will act as a backlight in the open position.

The sections of the display portion 130 illustrated in FIG. 6 hold the stack of layers 141–146 and 148 in place within the display portion 130. In another embodiment (not shown) a lens or optically transparent material, such as, for example, glass or quartz, may be positioned in the open areas 132 and 134 to allow improved viewing and/or to protect the display 149.

The electrodes 152 and 153 are operable to apply the switching voltage to the inner bistable clear-reflective layer 141. The electrodes 154 and 155 are operable to apply the switching voltage to the outer bistable clear-reflective layer 142. The electrode 156 is part of an array of electrode operable to control the pixel in the LCD stack 147, as is known to those of ordinary skill in the art. The application of voltage to the inner bistable clear-reflective layer 141 and the outer bistable clear-reflective layer 142 occurs simultaneously so that inner bistable clear-reflective layer 141 and the outer bistable clear-reflective layer 142 will switch modes simultaneously, providing one layer of reflective and one layer of clear material at all times. Thus, one of either the inner bistable clear-reflective layer 141 or the outer bistable clear-reflective layer 142 will act as the reflective layer of the display. In FIGS. 1 and 2, the inner bistable clear-reflective layer 141 is reflective and the outer bistable clear-reflective layer 142 is optically clear. In FIGS. 3 and 4, the inner bistable clear-reflective layer 141 is optically clear and the outer bistable clear-reflective layer 142 is reflective. The invention, however, is not limited in this regard, as the switching can occur non-simultaneously.

The switch 160 (FIG. 1) will cause the application of the switching voltage to the inner bistable clear-reflective layer 141 and the outer bistable clear-reflective layer 142 simultaneously in both FIGS. 5 and 6 when the body portion 110 and the display portion 130 of the communication device 100 are rotated into or out of the closed position. Thus display 140 is operable to display images 170 and 175 on one or the other side of the display 140, dependent upon the relative position of the body portion 110 (FIGS. 1–4) and the display portion 130 (FIGS. 1–4).

In order for the images to be viewed from both the outer side of the communication device 100 as shown in FIGS. 1–2 and from the inner side of the communication device 100 as shown in FIGS. 3–4 without one set of the images being upside down with respect to the other set of images, the set of images can be rotated about an axis parallel to the axis of rotation of the hinge 120 (FIGS. 1–4). Images can be letters, numbers, photographic images or video images.

If the image is comprised of rows of text, such as letters and numbers, each letter and each row of text can be considered as a set of images where each letter or number is an image. The sets of images must be rotated about the axis parallel to the axis of rotation of the hinge 120. Additionally, the letters and numbers, which were on the top row of the displayed image must be moved to the bottom row of the displayed image upon rotation. The letters and numbers, which were on the second row of the display must be moved to the second-to-the-last row of the displayed image upon rotation and so forth for each row of the display until the middle row of the display is reached. If there are an odd number of rows of text, for example N rows where N is odd, then the row numbered [((N−1)/2)+1] will be in the same position in the image before and after rotation. This process will be further described below.

If the image is a video or photographic image then the rows of pixels in the image must be rotated in the same manner as the sets of images were rotated for the text. If the open areas 132 and 134 (FIG. 1) are different shapes and sizes additional multiplication factors must be included in the rotation of the images if the complete image is to fit with the same shape factor into each open area 132 and 134.

Figure 7:
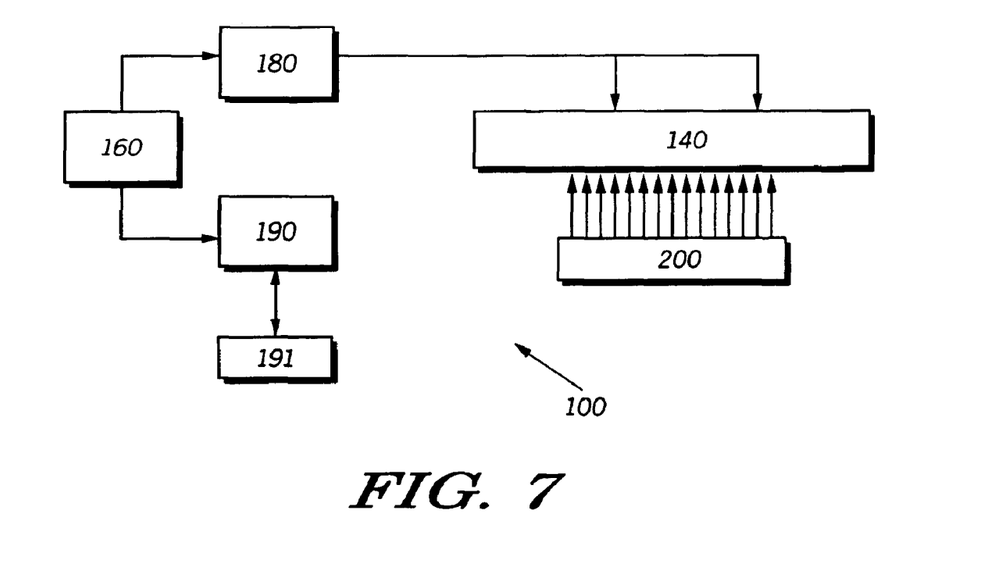
FIG. 7 illustrates, in block diagram, an embodiment of a switch and display interaction.

FIG. 7 illustrates, in block diagram, the interaction between the switch 160 and the display 140. Upon rotation of the body portion 110 with respect to the display portion 130 the switch is activated. Upon activation of the switch 160, a power source 180 within the communication device 100 receives a reverse-mode signal from the switch. Upon receiving the reverse-mode signal from the switch 160, the power source 180 can apply a pulse of voltage simultaneously, to the inner bistable clear-reflective layer 141 and the outer bistable clear-reflective layer 142 of display 140. These applied pulses are indicated by the double arrow line from the power source 180 to the display 140. Each voltage pulse applied to the inner bistable clear-reflective layer 141 and the outer bistable clear-reflective layer 142 switches the modes of inner bistable clear-reflective layer 141 and the outer bistable clear-reflective layer 142. Switching modes simultaneously ensures that there is always one reflective layer and one optically clear layer at all times. The communication device 100 can be configured so that the inner bistable clear-reflective layer 141 is reflective and the outer bistable clear-reflective layer 142 is clear when the communication device 100 is in the closed position. Although switching modes is not required to be simultaneous, a rapid transition is desirable in some embodiments of the invention, while other embodiments of the invention contemplate that the modes switch non-simultaneously.

Additionally, upon activation of the switch 160 a controller 190 within the communication device 100 receives a rotate-mode signal from the switch 160. One function of the controller 190 is to recognize sets of images within the images visible on display 140. A set of images may be a row of text, for example. This set of images is stored in a memory 191 electrically connected to the controller 190. The memory 191 may be a part of the processor. The image recognition process occurs periodically so the image stored in memory is updated when the image changes. Another function of the controller 190 is to determine how to rotate the images and rows of images within the set of images visible on display 140 so that, upon rotation, the set of images seen on the display will be the same when the communication device 100 is in the open position and the closed position. The controller 190 is electrically connected to the display circuitry 200, which controls the pixels in the displays 140 (and display 149). There are several electrodes in the pixel array, which is schematically indicated by the plurality of arrows from the display circuit 200 to the display 140. When the rotate-mode signal is received from the switch 160 by the controller 190, the controller 190 retrieves the updated stored image from memory with the recognized images and sets of images currently visible on display 140/149. Then the controller 190 determines how to modify the display circuitry 200 in order to rotate the images as described above. Then the controller 190, which is electrically connected to the display circuitry 200, sends input to the display circuitry 200, which will cause the set of images on the display 140/149 to be rotated as described above.

Figure 8:
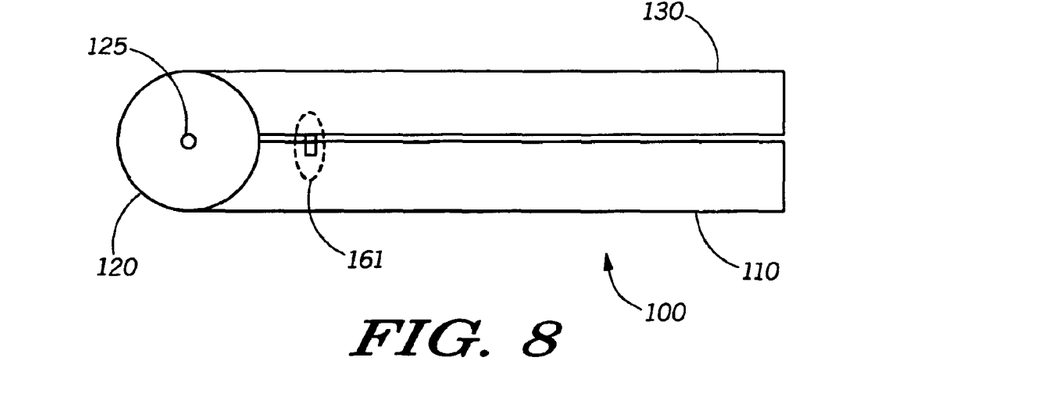
FIG. 8 illustrates schematically a first embodiment of a switch in the communication device while in a closed position.

FIG. 8 illustrates schematically a first embodiment of an electrical switch 161 in a communication device 100. The body portion 110 of the communication device 100 is attached with a hinge 120 to the display portion 130 of the communication device 100. The connecting hinge 120 has a central region 125 when viewed from the side. The axis of rotation (not shown) is normal to the hinge 120 and passes through the central region 125.

Figure 9:
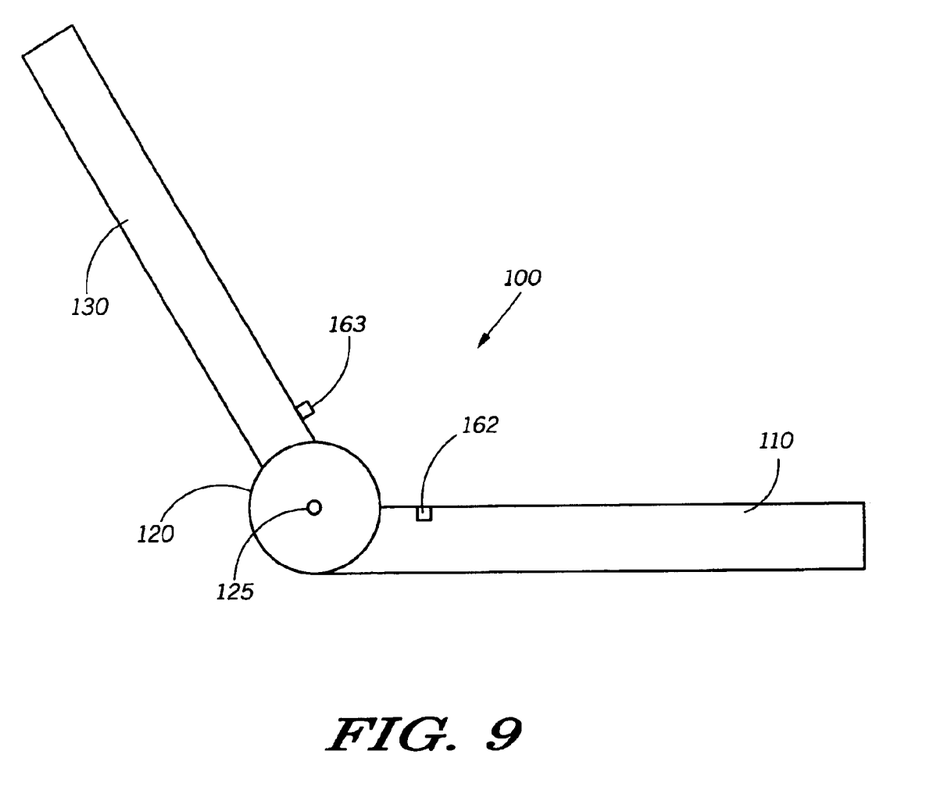
FIG. 9 illustrates schematically the first embodiment of the switch in the communication device while in an open position.

FIG. 9 illustrates schematically the first embodiment of the electrical switch 161 of FIG. 8, when the communication device 100 is in an open position. The body portion 110 and the display portion 130 have rotated about the connecting hinge 120 with an axis of rotation (not shown) normal to the central region 125 of the hinge 120. The electrical switch 161 is comprised of a display-side switch 163 which is on the display portion 130 and a body-side switch 162 which is on the body portion 110. The display-side switch 163 and the body-side switch 162 are positioned so that they are in contact with each when the communication device 100 is in the closed position and they are not in contact with each other when the communication device 100 is in the open position. The electronic switch 161 (FIG. 8) is activated when the display-side switch 163 and body-side switch 162 come into contact or are released from contact. Thus the electrical switch 161 (FIG. 8) is activated when the body portion 110 and the display portion 130 are brought into proximity and when the body portion 110 and the display portion 130 are rotated away from each other by rotation around the connecting hinge 120. Each time the body portion 110 and the display portion 130 are brought into proximity or rotated away from each other the switch is activated, and the power source 180 sends pulses of voltages to the inner bistable clear-reflective layer 141 and outer bistable clear-reflective layer 142 of display 140 (FIG. 5). The controller 190 retrieves the updated distinguished images from memory 191, determines how the display circuitry 200 must be modified to rotate the updated distinguished images and modifies the input to display circuitry 200 to rotate the images on the display 140. All this functions to provide the identical image to an observer of the display 140 in the communication device 100 before and after rotation of the body portion 110 and the display portion 130 with respect to each other.

Figure 10:
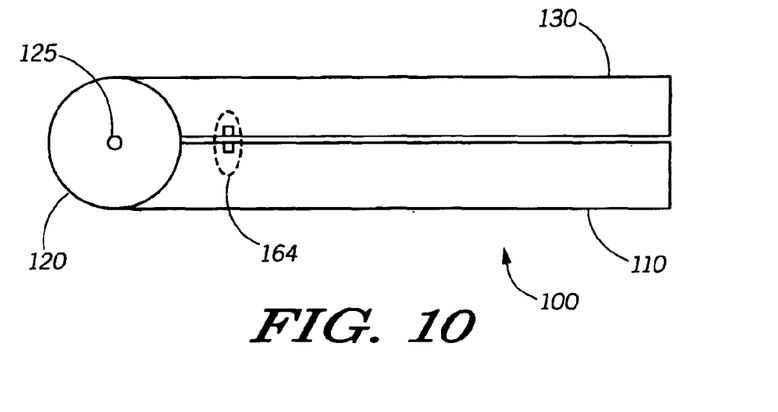
FIG. 10 illustrates schematically a second embodiment of a switch in the communication device while in a closed position.

FIG. 10 illustrates schematically an embodiment of a magnetic switch 164 in a communication device 100. The body portion 110 of the communication device 100 is attached with a hinge 120 to the display portion 130 of the communication device 100. The connecting hinge 120 has a central region 125 when viewed from the side. The axis of rotation (not shown) is normal to the hinge 120 and passes through the central region 125.

Figure 11:
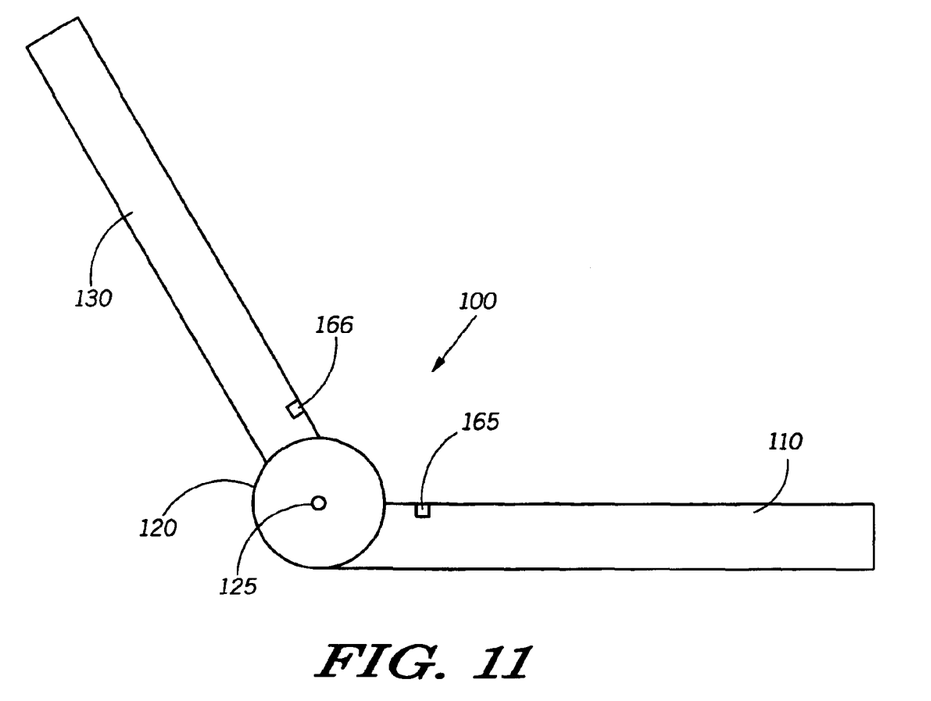
FIG. 11 illustrates schematically the second embodiment of the switch in the communication device while in an open position.

FIG. 11 illustrates schematically the embodiment of the magnetic switch 164 of FIG. 10, when the communication device 100 is in an open position. The body portion 110 and the display portion 130 have rotated about the connecting hinge 120 with an axis of rotation (not shown) normal to the central region 125 of the hinge 120. The magnetic switch 164 is comprised of a display-side switch 166, which is on the display portion 130, and a body-side switch 165, which is on the body portion 110. The display-side switch 166 and the body-side switch 165 are positioned so that they are proximally located above each other when the communication device 100 is in the closed position and they are not proximally located above each other when the communication device 100 is in the open position. The magnetic switch 164 (FIG. 10) is activated when the display-side switch 166 and body-side switch 165 come into being proximally located above each other or are removed from being proximally located above each other. Thus the magnetic switch 164 (FIG. 10) is activated each time the body portion 110 and the display portion 130 are brought into proximity and each time the body portion 110 and the display portion 130 are rotated away from each other by rotation around the connecting hinge 120. Every time the body portion 110 and the display portion 130 are brought into proximity or rotated away from each other the magnetic switch 164 is activated, and the power source 180 sends pulses of voltages to the inner bistable clear-reflective layer 141 and outer bistable clear-reflective layer 142 of display 140 (FIG. 5). The controller 190 retrieves the updated distinguished images from memory 191, determines how the display circuitry 200 must be modified to rotate the updated distinguished images and modifies the input to display circuitry 200 to rotate the images on the display 140. All this functions to provide the identical image to an observer of the display 140 of a communication device 100 before and after rotation of the body portion 110 and the display portion 130 with respect to each other.

The interaction outlined in FIG. 7 can be used to describe the interactions of switches 160 (FIG. 1), 161 (FIG. 8) or 164 (FIG. 9) with the displays 140 (FIG. 5), 149 (FIG. 6) or another other embodiment of the display. Other types of switches, including but not limited to, mechanical switches, piezo-electric switches, pneumatic switches, shape memory based switches and solenoid based switches may be used to operate within this communication device 100 as operably described herein.

The illustrated embodiment of communication device 100 is meant to illustrate a structure and method to provide an image (170, 175) on either side of a display 140, where the side upon which the image (170, 175) is displayed is dependent upon the position of display portion 130 with respect to the body portion 110 of the communication device 100, and is not intended to be exhaustive of all possibilities or to limit what can be fabricated for the aforementioned purpose. Those of ordinary skill in the art will recognize that in place of a LCD device, LCOS devices may be used in place of LCD devices. There is therefore a multiplicity of other possible combinations and embodiments. By using what is shown and described herein, a dual directional display 140 can be incorporated into communication devices 100 such as cell phones, PDA's, global positioning systems, lap-top computers, digital cameras and camcorders, video screens in vehicles such as cars and airplanes, televisions, computer monitors and other such communication devices. Those having ordinary skill in the art will therefore appreciate the benefit of employing an embodiment of device structure 100 in numerous and various devices.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

We claim:

1. A communication device, comprising:

a body portion;

a display portion rotatably connected to the body portion, the display portion including an inner and an outer bistable clear-reflective layer; and a switch operable to reverse modes of the inner and outer bistable clear-reflective layers responsive to rotation of the display portion with respect to the body portion.

2. The device of claim 1 wherein the display portion further comprises a LCD stack positioned between the inner and outer bistable clear-reflective layers.

3. The device of claim 1 wherein the inner and the outer bistable clear reflective layers are in opposite bistable modes.

4. The communication device of claim 1, further comprosing:

a power source, wherein the power source provides a voltage pulse to the inner and outer bistable clear-reflective layers responsive to the switch.

5. The communication device of claim 1, further comprising:

a controller electrically connected to the display to rotate images on the LCD stack, wherein the switch is operable to signal the controller to rotate the images on the LCD stack in response to the rotation.

6. The communication device of claim 5, wherein the images comprise letters and numerals.

7. The communication device of claim 5, further comprising:

a hinge rotatably connecting the display portion to the body portion of the communication device wherein the hinge has an axis of rotation and wherein the images rotate about an axis parallel to the axis of rotation of the hinge.

8. The communication device of claim 1, further comprising:

a lightguide wherein the lightguide provides frontlighting when the display portion is in a closed position and wherein the lightguide provides backlighting when the display portion is in an open position.

9. The communication device of claim 1, wherein the inner bistable clear-reflective layer is clear when the display is in an open position and reflective when the display is in a closed position.

10. The communication device of claim 6, wherein the outer bistable clear-reflective layer is reflective when the display portion is in an open position and clear when the display portion is in a closed position.

11. The communication device of claim 1, wherein the switch is selected from a group consisting of mechanical switches, magnetic switches, electrical switches, piezoelectric switches, pneumatic switches, shape memory based switches, solenoid based switches and combinations thereof.

12. A method for displaying information on a display of a communication device, the method comprising:

sending a reverse mode signal to an inner and an outer bistable clear-reflective layer of the display responsive to a rotation of the display with respect to a body portion of the communication device, wherein the mode of the outer bistable clear-reflective layer and the mode of the inner bistable clear-reflective layer are reversed responsive to the reverse mode signal.

13. The method of claim 12, wherein the outer bistable clear-reflective layer and the inner bistable clear-reflective layer are in opposite modes.

14. The method of claim 12, further comprising:

rotating images on the display in response to the rotation of the display with respect to the body portion of the communication device.

15. The method of claim 14, wherein the images comprise letters and numerals.

16. The method of claim 12, wherein the images are rotated about an axis parallel to an axis of rotation of the display with respect to the the body potion.

17. The device claim 2 wherein the LCD stack comprises an inner polarizer layer, an inner glass layer, an outer glass layer, and an outer polarizer layer.

* * * * *